Jan. 13, 1959 — R. C. HITCHCOCK ET AL — 2,869,065
VOLTAGE AND CURRENT BATTERY CHARGING
AND DISCHARGING CONTROL CIRCUITS
Filed March 7, 1958 — 4 Sheets-Sheet 1
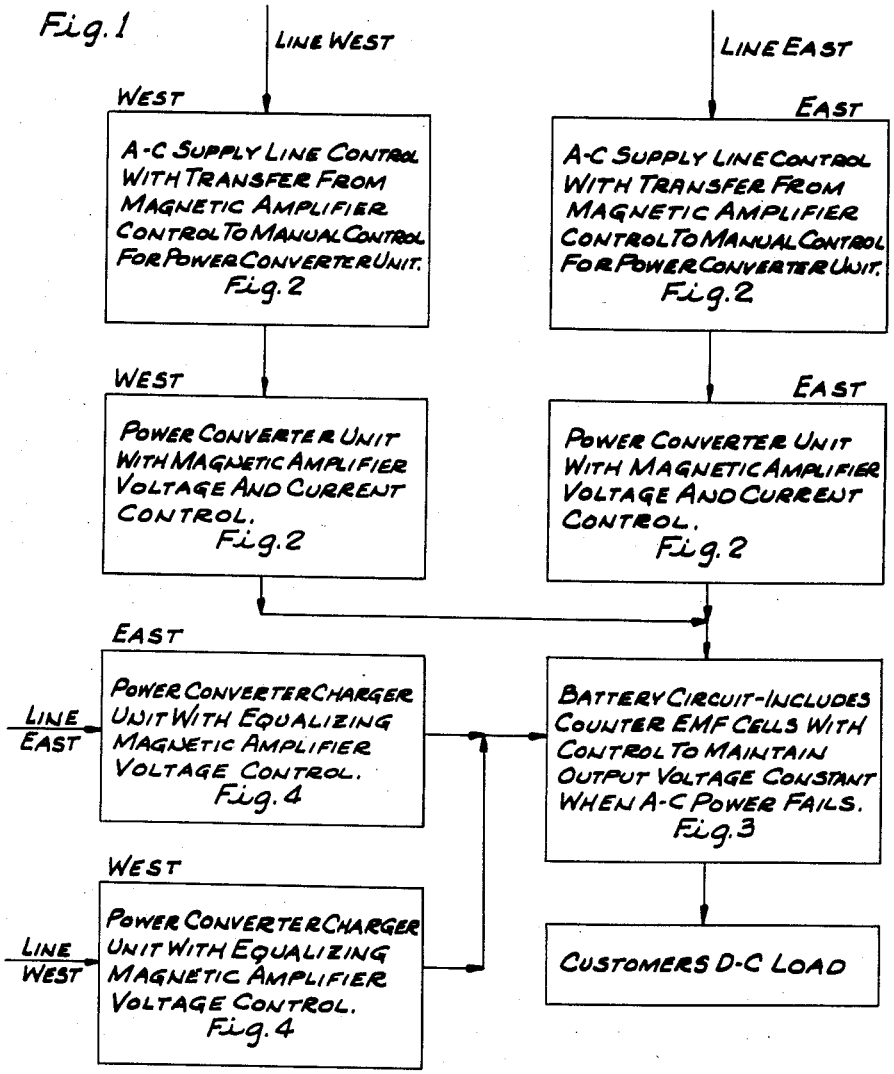
INVENTOR.
RICHARD C. HITCHCOCK
AND EDGAR V. WEIR
BY
THEIR ATTORNEY

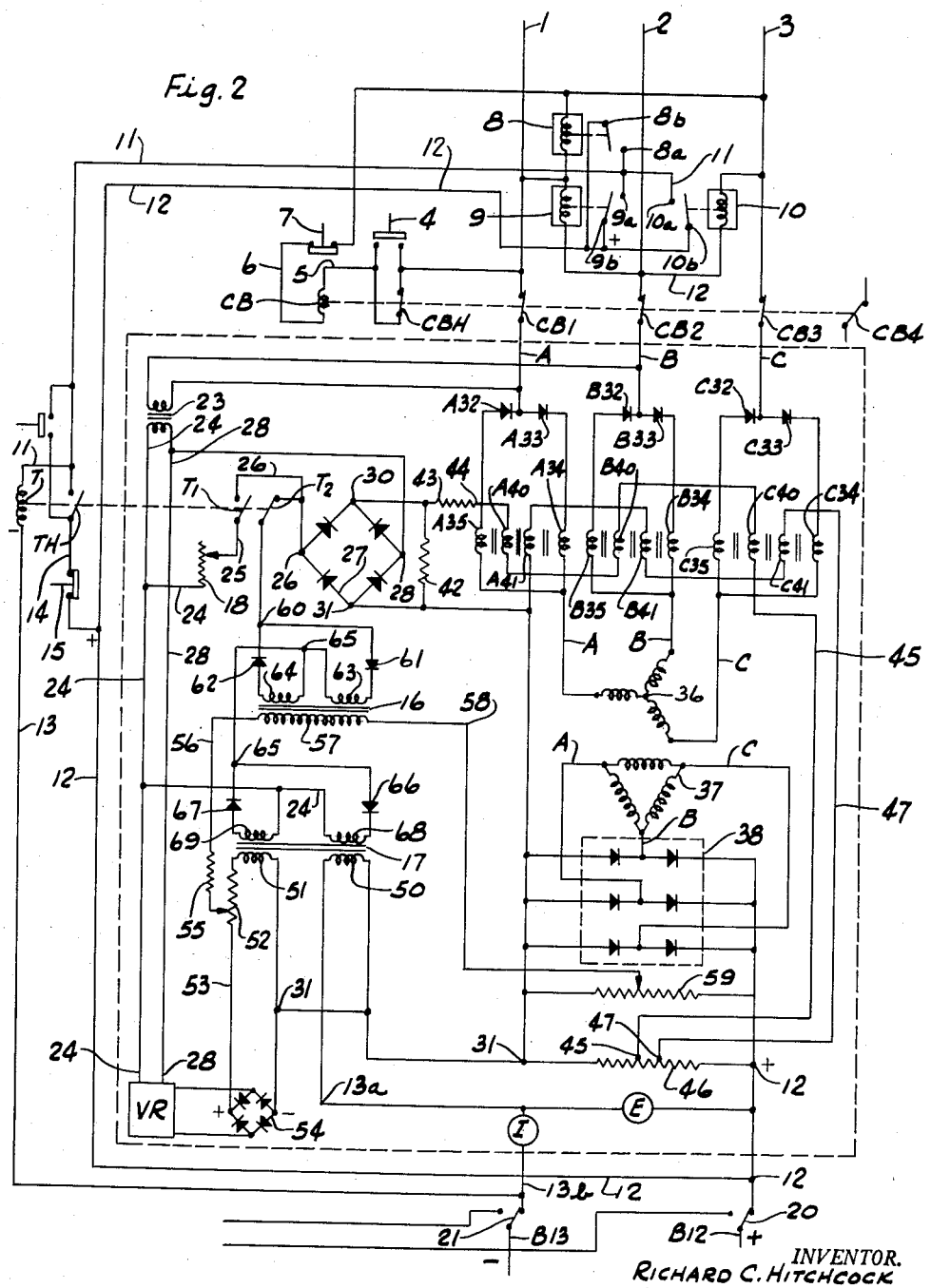

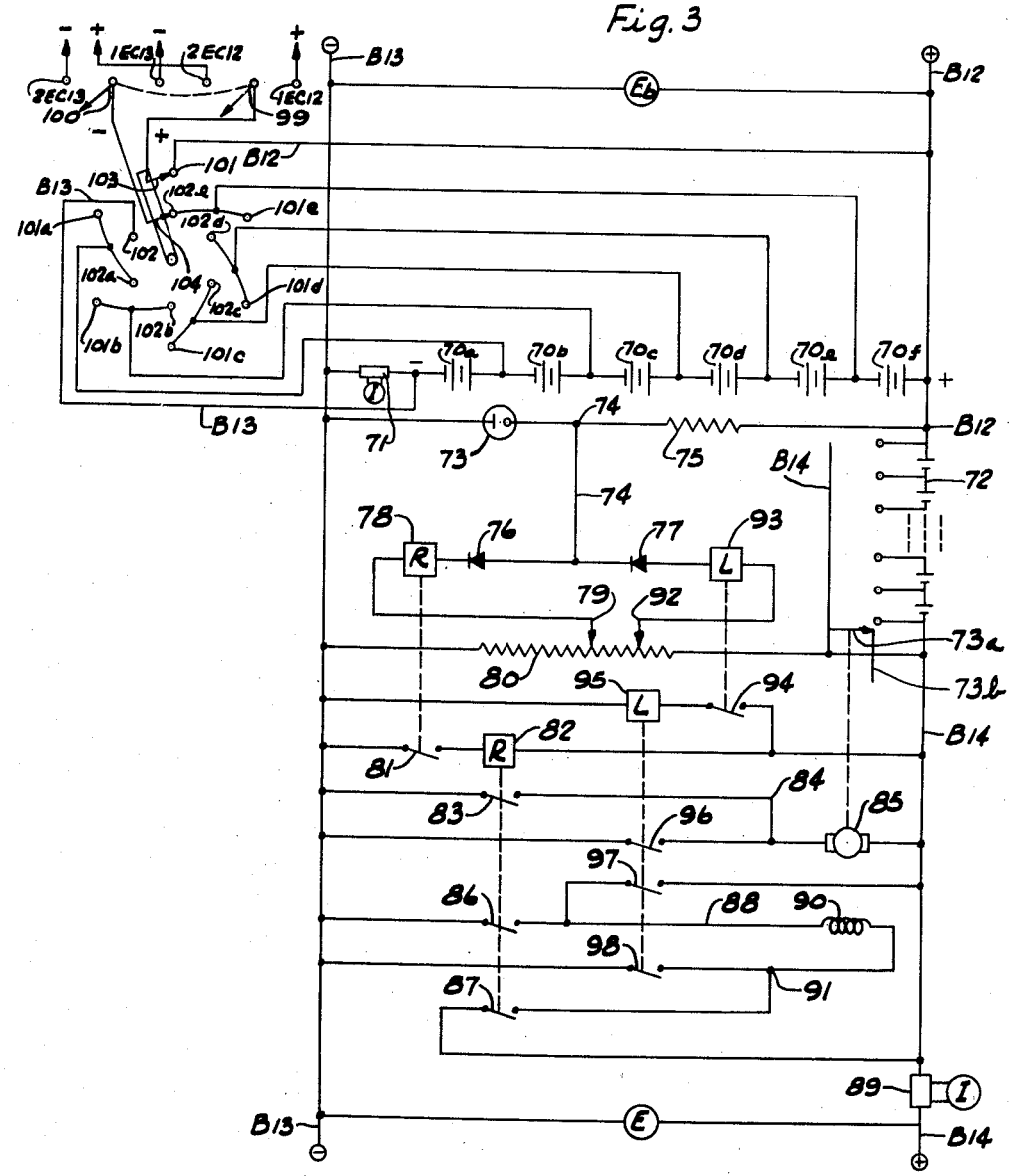

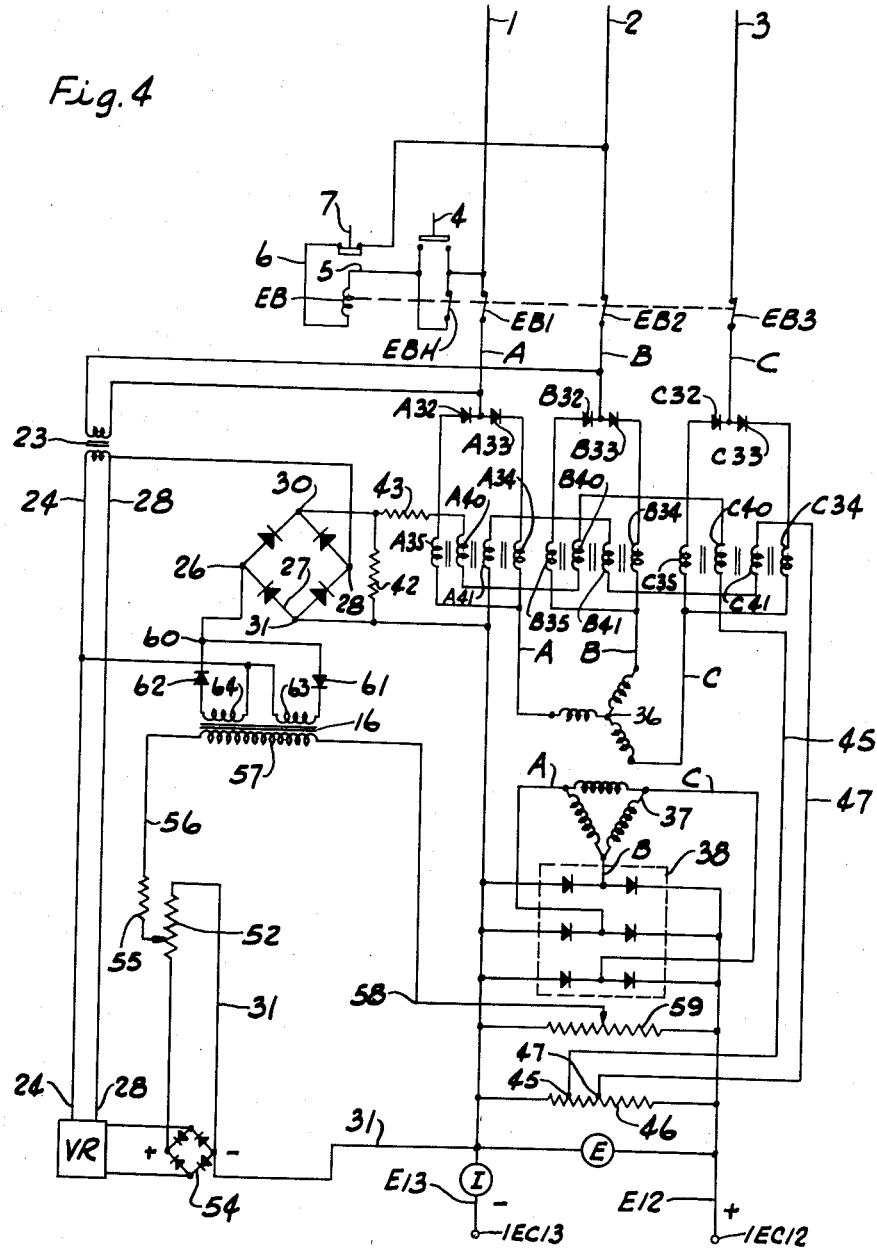

United States Patent Office 2,869,065
Patented Jan. 13, 1959

2,869,065

VOLTAGE AND CURRENT BATTERY CHARGING AND DISCHARGING CONTROL CIRCUITS

Richard C. Hitchcock, Indiana, and Edgar V. Weir, Butler, Pa., assignors to Syntron Company, Homer City, Pa., a corporation of Delaware Application March 7, 1958, Serial No. 719,876

11 Claims. (Cl. 320—18)

This invention relates generally to battery charging and discharging control circuits and more particularly to a voltage control during normal current charging loads and a current control for over current charging loads and during that period of future and subsequent restoration of the charging circuits, a control of the battery voltage through progressive declining and progressive ascending battery voltage under simultaneous current control conditions to maintain as nearly as possible a constant power supply.

The problem involved is best demonstrated in conjunction with the art of sheet glass drawing wherein a power failure for a very short period of time is extremely costly and may result in the loss of the structure in the bay of a glass tank and the renovating of the glass drawing machinery. The loss of motor torque on the drawing machine for one second may ruin a complete run of glass so even the transfer of power from generators to batteries is apt to be more disastrous than practical.

The problem specifically is to maintain a D. C. voltage of 267 volts to 288 volts on a storage battery and hold it to 2% variation for A. C. line variations of 10%. One object of this invention is the provision of a charging control circuit that is basically a voltage control operation until the maximum rating of the charger is reached and when the charging rate required by the load exceeds this amount, so that loss of power is being drained from the battery to feed the load, then the voltage control is relinquished and a current control takes over the system.

This is accomplished by providing two magnetic amplifiers connected in series, one being voltage sensitive and the other being current sensitive. Both of these magnetic amplifiers are connected to regulate one control winding on a self-saturating reactor. When the current output of the battery circuit is less than 30 amperes, the normal D. C. output ratio, the maximum charging capacity of the feeding rectifier, the current sensitive magnetic amplifier is in effect short-circuited and the voltage sensitive magnetic rectifier regulates the controls. If the current load exceeds 30 amperes resulting in a requirement for increased voltage the current sensitive magnetic amplifier becomes effective to lower the output voltage which results in the reduction of the output current as required. The current sensing magnetic amplifier device comprising this invention has two one turn windings and is applicable to heavy currents such as 50 amperes, whereas the voltage sensing magnetic amplifier has windings of several hundred turns thus adapting it to milliamperes or voltage control.

During low output load values of current from the battery, the battery voltage may fluctuate due to the increase in its back E. M. F. from charging. Thus voltage fluctuation may cause hunting of the control circuits. Another object of this invention is the provision of a short-circuiting winding on the self-saturating reactor which eliminates this hunting action by increasing the time constant of response to the control of the reactor.

Another object is the provision of the use of diodes such as full bridge dry disc rectifier, even though sensitive to current variations, as a source of constant reference voltage in combination with a filter capacitor for the current sensitive magnetic amplifier.

Another object is the provision of a battery charging circuit to supply a motor load that has in series therewith a number of counter E. M. F. cells, their connection to the circuit being controlled to insert and remove them to maintain constant voltage and uniform power output to the motor load.

Another object is the provision of sectionalizing the battery to equalize the battery charge by providing an extra charge for consecutive sections of the battery during consecutive periods to equalize the cells making up the battery bank and at the same time trickle charging the battery bank to supply the load and maintain the battery as a bank at full charge.

Another object is the provision of a control circuit that will eliminate counter E. M. F. cells consecutively when necessary to maintain constant output battery voltage upon the drop in the battery voltage which may be due to battery cell changes or a failure in the A. C. power supply, and conversely to restore the counter E. M. F. cells consecutively as the battery voltage becomes restored by short-circuiting the counter E. M. F. cells without opening their respective connections to the circuit.

Another object is the provision of a manual control for regulating the voltage of the battery charging circuit to the same value as that of the battery itself before directly connecting the battery charging circuit with the battery circuit and subsequently raising the voltage of the connected charging and battery circuits before subjecting this circuit to automatic control. By operating the controls in this manner a constant voltage may be provided for the D. C. motor load without a sudden increase or decrease in the voltage which would increase or decrease the torque applied by the motor load.

A further object of this invention resides in the provision of a storage battery charging circuit having 2% voltage output control for 10% line voltage variation up to the current capacity of the power conversion unit and when the load current exceeds that of the normal current capacity of the power conversion unit, then the current limiting control takes over to permit as much output current as is safe but with appropriately reduced voltage to obtain good regulation of the motor load without a dangerous loss of torque.

Another object is the provision of a simultaneous trickle charge and an equalizing charge of a storage battery bank by charging the battery as a whole to supply more than the necessary load and charging consecutive sections of the battery bank to equalize the voltage of the different cells making up the battery sections to avoid undesirable over voltage in restoring by equalization the separate battery cells.

Other objects and advantages appear hereinafter in the following description and claims.

The accompanying drawings show for the purpose of exemplification without limiting this invention or the claims thereto, certain practical embodiments illustrating the principles of this invention wherein:

Fig. 1 is a view in the nature of a flow chart illustrating this invention.

Fig. 2 is a view of the supply and transfer circuit in combination with the automatic voltage and current magnetic amplifier control circuits comprising this invention.

Fig. 3 is a view of the battery and counter E. M. F. cell circuit that maintains output voltage constant when A. C. power fails.

Fig. 4 is a view of the automatic magnetic amplifier equalizing charger control circuit.

Referring to Fig. 1 the general layout of the control circuits making up this invention are illustrated in a block type flow diagram with the initial arrows marked Line East and Line West indicating an independent supply of A. C. power each with a transformer bank, circuit breakers and line protection to supply suitable voltage with proper phase and coming from opposite directions indicating that they are preferably from two independent sources. If such feed lines come independently from opposite directions, it is likely that both would never be out at the same time due to storms or the like. It is also likely that each line, whether east or west would in itself be supplied by standby feed circuits that take over to continue the service from that direction before the fault is even cleared. This type of service is available in most up-to-date operating power companies throughout the country and the control and operating circuits comprising this invention take over after every precaution and protection by the power companies has failed and when the power drops or goes out then the battery voltage must be regulated to keep a constant torque load on the glass drawing motors. If one or both east and west lines fail or a surge occurs which is sufficiently great to drop out one phase of a line, then the manual control takes over to permit regulation of the A. C. voltage to match the D. C. supply voltage with the battery voltage before reconnecting the same.

However in normal practice the two independent sources of A. C. supply east and west are alternated periodically so that one is always sure that there is nothing wrong with the standby equipment. The alternate use of these opposite feed lines may be for periods of one week each.

The first control circuits comprising this invention are found in the circuits indicated in Fig. 1, there being two indicated as east and west lines. These control circuits are the same and function in the case of failure of any one phase of the A. C. line to permit manual control of the D. C. voltage. Thus the circuits of A. C. supply line control are illustrated on the outside of the dotted enclosure of Fig. 2 and each of these manual voltage control circuits functions in combination with their own magnetic amplifier control circuits indicated as the power conversion units for east and west magnetic amplifier control circuits which are illustrated within the dotted lines of Fig. 2.

The output of these D. C. feeding circuits may be connected directly to the battery circuit indicated in Fig. 1 as the battery circuit and as shown in detail in Fig. 3.

The equalizing battery charging circuits indicated as the power converter chargers for line east and line west are also duplicated and supplied from the separate east and west A. C. supply lines. These circuits are quite similar to the magnetic amplifier circuits of Fig. 2 but do not have the manual control or the current control. These power converter chargers are, of course, identical circuits and are alternately used periodically as are the line east and line west circuits. The output of the battery circuit is supplied to the customers' D. C. load which would be the D. C. motor means employed in this instance for drawing glass from the tank.

Referring to Fig. 2 the three phase line represented by the lines 1, 2 and 3 may be either the east or west line and the whole of the circuit shown is either the west or the east manual circuit controls in combination with the automatic magnetic amplifier. This three phase line is controlled by the circuit breaker represented by the circuit breaker operating and holding coil CB which controls the contacts CBH the holding contact and the switch contacts in each phase of the line as indicated at CB1, CB2 and CB3. Additional contacts are provided for other controls as indicated at CB4. The circuit breaker operating and holding coil CB is energized between lines 1 and 3 traced from line 1 through normally open or start pushbutton 4, which is in multiple with its own holding contact CBH, the line 5 to the operating coil CB, the line 6, the normally closed or stop pushbutton 7 to the line 3.

Control relays 8, 9 and 10 have their operating coils connected across the supply lines with relay 8 connected across lines 1 and 3, relay 9 connected across lines 1 and 2 and relay 10 connected across lines 2 and 3. Each of these relays have a normally open back contact indicated by the suffix "a." These back contacts 8a, 9a and 10a are all connected together by the line 11. The heels of these contacts are indicated by the suffix "b." These heels 8b, 9b and 10b are all connected together by the line 12 which is also the positive side of the D. C. power output line, the negative side of which is 13. The lines 11 and 13 are connected to opposite sides of the D. C. transfer relay T which has a TH or hold contact connecting line 11 to line 14 which in turn is connected to the normally closed pushbutton 15, the other side of which is connected to D. C.+ or 12. Thus the A. C. protective relays 8, 9 and 10 have their normally open back contacts 8a, 9a and 10a connected in multiple with the normally closed pushbutton 15 and the hold contact TH of transfer relay T.

Thus the transfer relay T is normally deenergized and if for any reason any one of the protective relays 8, 9 or 10 should be deenergized due to some form of power outage, any one of their contacts will connect D. C. from positive line 12 to line 11, transfer relay coil T to negative D. C. 13 to energize the transfer relay coil T which upon closing its own holding contact TH will maintain this relay energized through the normally closed release pushbutton 15.

Upon energizing the relay T, its contact T1 closes and contact T2 opens thereby removing the voltage control magnetic amplifier 16 and the current control magnetic amplifier 17 from the circuit and at the same time placing the variable resistance 18 in the circuit so that one can manually change the output voltage measured across the contacts 12 and 13 before connecting the + and − battery switches 20 and 21 respectively. This circuit is supplied from phases 1 and 2 by means of the isolation step-down transformer 23, the secondary of which is connected to the line 24 and supplies current to one side of the adjustable resistor 18, the other side of which is connected by the line 25 to the contact T1 which when closed connects the line 25 to line 26 or the A. C. terminal of the bridge rectifier 27. The opposite A. C. terminal of this bridge rectifier is connected by the line 28 to the opposite end of the secondary of the transformer 23. Thus the A. C. supplied from the isolation step-down transformer 23 may be controlled manually through the adjustable resistance 18 and the output thereof flows to the positive and negative D. C. terminals of the bridge rectifier 27 as indicated at 30 and 31 respectively.

The three phase line illustrated in Fig. 2 being assumed to the lines east passes through the circuit breaker contacts CB1, CB2 and CB3 representing phases A, B and C, each of which is supplied to the midposition of its respective doubler rectifier 32 and 33 such as indicated as phase A as A32 and A33 and phase B as B32 and B33 and for phase C as C32 and C33. This doubler rectifier for each phase is connected in series with the corresponding reactor coils indicated for the phase A as A34 and A35 and for phase B as B34 and B35 and for phase C as C34 and C35. Each of the rectifiers A32 and A33 being in a closed series circuit with the reactor coils A34 and A35 in the order named, whereas the phase lines A, B and C are connected intermediate of the rectifiers that are again connected at the opposite side of this loop circuit intermediate of the reactor coils 34 and 35 again forming the three phase lines A, B and C that are connected to the outer ends of the three phase star connected primary 36. The three phase delta connection 37 again forming the three corresponding phase lines A, B and C which in turn are connected to the intermediate point of the full wave three phase bridge rectifier indicated at 38 with each phase being connected to the intermediate position of the single rectifier leg, the rectifiers in which are all faced in the same direction, one side being connected to the + or positive 12 and the opposite end being connected to the — or negative side 31 which is also the negative side of the bridge rectifier 27.

Two additional reactor coils making four in all are provided for each phase. These reactor coils are indicated as A40 and A41 in phase A and B40 and B41 in phase B and C40 and C41 in phase C.

A resistance 41 is connected across from the positive 30 to the negative 31 of the bridge rectifier 27 and a second resistor 43 is connected between the positive end 30 of the bridge 27 and the line 44 which is connected to one end of the reactor coil A40 which is in turn connected in series with each of the reactor coils B40 and C40, the opposite end of the latter being connected by the line 45 to an intermediate point of the potentiometer 46, the opposite ends of which are connected between the +12 and —31. In like manner a second tap intermediate the tap 45 and the T12 end which is indicated at 47 connects each of the reactor coils C41, B41 and A41 in series and the opposite end of the latter is connected directly to the —31.

Thus the four reactor coils for each phase indicated by the numerals 34 and 35 are saturable by the direct current supplied through the reactor coils 40 and 41 and the series connections of the reactor coils 40 are opposite to that of the reactor coils 41 and are thus effective on the iron in the circuit to saturate the core and thereby control the saturable reactor coils 34 and 35 of each of the three phases. When the line east represented by lines 1, 2 and 3 which after passing their circuit breaker become A, B and C respectively are normally supplied with current, the current when properly controlled after passing through the saturable reactors results in a controlled AC voltage on the star connection 36 of the transformer to the delta 37 and results in a rectified voltage from the 12+ to 31— and the 31— is supplied to one side of the magnetic amplifier winding 50, the other side of which is connected to the negative D. C. output line 13a. The negative D. C. output line 31 is also connected directly to one side of the coil 51 of the current magnetic amplifier 17, the opposite side of which is connected through the resistor 52 and the opposite end of the resistor being connected by the line 53 to the positive end of the bridge rectifier 54, the negative end being connected to the line 31.

The isolation or step-down transformer 23 has its secondary connected to the voltage regulator indicated at VR which supplies a constant voltage to the bridge rectifier 54 thus supplying a constant D. C. voltage to the winding 51 of the current control magnetic amplifier 17.

A series resistance 55 is connected to an intermediate tap in the resistance 52 and its opposite end is connected to the line 56 to one end of the coil 57 of the voltage control magnetic amplifier 16, the other end of which is connected by the line 58 to an intermediate tap in the resistance 59 connected between the output +12 and —31.

The A. C. terminal 26 of the bridge rectifier 27 is also connected through the back contact T2 of the transfer relay T to the line 60 when the three phase line A, B and C is supplying current to the battery and there has been no outage. The line 60 is connected by means of the doubler rectifier indicated by the legs 61 and 62, each of which is in series with the coils 63 and 64 of the voltage control magnetic amplifier 16 and the rectifier 61 supplying current to the coil 63 in the opposite direction from the current supplied by the rectifier 62 to the coil 64. Thus the iron of the voltage control magnetic amplifier 16 receives the magnetic flux from opposite side of the A. C. wave through this doubler rectifier circuit and the opposite ends of the coils 63 and 64 are connected by the line 65 to a second doubler circuit represented by the rectifiers 66 and 67 supplying the coils 68 and 69 of the current control magnetic amplifier 17 respectively in the same manner as that previously described and the opposite ends of the coils 68 and 69 are connected directly to the line 24 or the opposite side of the secondary of the isolation step-down transformer 23.

Thus an alternating current supplied by the isolation transformer 23 would travel through the line 28, one leg of the bridge rectifier 27 to the positive connection 30, thence through resistance 43, saturable reactor coils A40, B40, C40 and thence through line 45 and a portion of the resistance 46 to the negative output 31 and thence through the opposite leg of the bridge rectifier 27 to the A. C. point 26 from whence it would flow through contact T2, doubler rectifier circuit in the primary of the voltage magnetic amplifier 16 and the doubler rectifier circuit of the current control magnetic amplifier 17 and return to the opposite side of the secondary of the isolation transformer 23. This current flow is modified by the current supplied from the intermediate tap in the resistor 59 of line 58, the coil 57 of the secondary or constant winding of the voltage control magnetic amplifier 16 and thence through the resistance 55 and 52 to modify unidirectional impulses in the coil 51 and thence returned by the line 31 to the other end of the resistance 59.

The voltage across the potentiometer 59 thus controls the direct current winding in the voltage control magnetic amplifier 16 and also has some effect on the biased D. C. coil 51 of the current control magnetic amplifier 17.

A constant bias is supplied from the tap 47 of the potentiometer 46 through each of the reactor coils connected in series as indicated at C41, B41 and A41 to the return side of the D. C. output as indicated at 31.

Thus a variation in voltage is controlled by the isolation transformer 23 through the bridge rectifier and the voltage and current control magnetic amplifiers in effecting the flow of unidirectional current through the saturable reactor coils A40, B40 and C40. However, when the current drawn through the coil 50 of the magnetic current coils amplifier 17 and the current traveling from the D. C. minus output 31 to D. C. —13a is greater than that of the normal output current, it will overcome the flux created by the pulsating current supplied through the coil 68, and supply current for the current control magnetic amplifier 17 to dampen out the voltage control through the magnetic amplifier 16 and effect a control of its own through the saturable reactors A40, B40 and C40.

If the lines 1, 2 and 3 fail which is representative of lines east then the switches 20 and 21 are thrown to connect the same type of circuit that is the same type of circuit represented in Fig. 2 for supplying a D. C. load from lines west.

When it is necessary to match the voltage of the power supplied from the D. C. output +12 and —13 with the battery voltage, it is necessary to provide a voltmeter E between the terminals 12 and 13 and an ammeter is also provided as indicated at I in the line 13.

On the opposite sides of the switches 20 and 21 is provided the battery terminals as indicated at B12 for plus and B13 for minus and a second voltmeter $E_b$ is provided to read this voltage. When matching the charging voltage with the battery voltage, the automatic control has been turned off by reason of the energization of the transfer relay T. The variable resistance 18 is actuated so that the output voltage E is equivalent to the battery voltage EB and when the voltage is equivalent the switches 20 and 21 may be closed and the variable resistance 18 is changed to slowly increase the voltage to that which is normal at which time the pushbutton 15 is depressed to deenergize the transfer relay T and permit the circuit to be automatically controlled through the voltage control magnetic amplifier 16 and the current control magnetic amplifier 17.

Referring now to Fig. 3 the positive D. C. line B12 and the negative D. C. line B13 extend to the battery 70 made up of six sections 72a, b, c, d, e, f, in which a shunt member 71 is placed in series therewith for the purpose of supplying a current reading to the ammeter I for measuring the current input or output to the battery 70. The negative bus B13 extends through the circuit, whereas the positive bus is interrupted by a bank of counter E. M. F. cells indicated at 72, each cell having a contact on each side thereof which contact is arranged to be engaged by a sliding contact member 73a which in turn is connected to the D. C. output positive indicated by B14. On the battery side of the counter cells a reference tube 73 in the form of a regulator tube that holds a constant drop from negative B13 to the line 74 and from the line 74 through the series resistance 75 to the line B12. The line 74 is also connected between the rectifiers 76 and 77 which are mounted as a leg faced in the same direction that provides the flow of energy from the bus B12 through the resistor 75, the line 74, the rectifier or diode 76, the sensitive "raise" relay 78, thence to the adjustable connection 79 to the potentiometer 80 and negative bus B13. Thus the relay 78 becomes energized when the battery voltage is low and it is necessary to raise the same. This relay has a single contact 81 that is connected between the negative bus line B13 and the coil of operating relay 82, the other side of which is connected to the positive bus line B14. The operating relay 82 is provided with three contact members. The first contact member 83 closes the circuit from the negative bus line through the line 84 and the armature 85 of a D. C. motor, the opposite side of which is connected to the positive bus line B14. This armature is connected mechanically to move the contact member 73a, with its long shorting contact 73b, upwardly as viewed in Fig. 3 for shorting one or more of the counter E. M. F. cells 72 to the positive bus circuit B14. The other two contacts 86 and 87 of the operating relay 82 arrange to close the circuit from the negative bus line B13 through the line 88 to the field 90 of the D. C. motor represented by the armature 85 and thence to the line 91, the contact 87 and the positive bus line B14. This completes the circuit and energizes the D. C. motor and causes the armature 85 to move the contactor 73 upwardly to short the counter E. M. F. cells until the voltage across the output bus B14 to B13 has been raised and the constant reference voltage tube 73 makes a circuit ineffective in picking up the relay 78 at which time the relay 82 drops out.

If on the other hand, the voltage between the output terminals of the bus B14 to B13 is high, current travels from the bus B14 through the variable contact member 92 engaging the potentiometer 80, relay 93 and the diode 77 to the line 74 and thence through the reference tube 73 to the negative bus lines B13. When relay 93 becomes energized it closes its contact 94 which in turn energizes operating relay 95 by connecting the same between the positive bus B14 and the negative bus B13. When relay 95 becomes energized it closes its contacts 96, 97 and 98. The contact 96 connects the negative bus line B13 to the line 84 for the purpose of energizing the armature 85 of the D. C. motor and the contacts 97 and 98 connect the lines 88 and 91 to the positive bus terminal B14 and the negative bus terminal B13 respectively thereby changing the direction of the current flowing through the field 90 of the D. C. motor and reversing the rotation of the same to move the contact slider 73 downwardly in engagement with the contacts between the E. M. F. cells to successively insert each of the cells into the circuit and thereby decrease the voltage between the bus terminals B14 and B13 which is the opposite function to that of the relays 78 and 82. Thus the foregoing circuit produces an automatic shift of the number of E. M. F. cells in series with the load to maintain a constant D. C. voltage output regardless of the rectified voltage input from the terminals B12 and B13 and even though there may be a variation in the A. C. line voltage supplying the rectifier circuit as illustrated in Fig. 2.

Thus during an emergency operation when one or more of the phases of the A. C. power fails, the storage battery 70 supplies the necessary D. C. output power to the load terminals B14 and B13 measured by the voltage E thereacross and the current passing through the shunt 89 as illustrated in Fig. 3. The counter E. M. F. cells 72 which are in series with the output load terminals must be increased or decreased with the voltage demand so as to keep a constant torque on the motors drawing the glass. If the output voltage from the positive bus B14 to the negative bus B13 as measured by the voltmeter E drops, the voltage will be sustained across the reference tube 73 but the voltage across the potentiometer 80 will drop thereby actuating the sensitive relay 93 to close its contact 94 to operate the motor 85 and eliminate the counter E. M. F. cells to raise the voltage conversely. If the load current drops the voltage across the reference tube 73 will be higher than the voltage across the potentiometer 80 and the other sensitive relay 78 will become energized so that its contact 83 will add more counter E. M. F. cells to the circuit to maintain the proper voltage at the load output across from the positive bus B14 to the negative bus B13.

It should be noted that the counter E. M. F. cells are always in the circuit and the battery circuit at no time becomes open or broken regardless of whether it is being charged, discharged, or whether or not the E. M. F. cells are being added or subtracted from the circuit.

Thus a constant 2% voltage output of the charging circuit shown in Fig. 2 is maintained on the battery 70 even though the supply line may vary as much as 10% of the line voltage up until the current capacity of the charger or power conversion unit. If the current required is greater than the normal current capacity of the power conversion unit the current limiting control takes over to permit as much output current as is safe with the appropriately reduced voltage at the feed circuit B12 and B13.

When supplying a power conversion charging circuit such as shown in Fig. 2 for the purpose of supplying the load and maintaining the charge in the battery, the several cells in the battery become unequalized and it is also difficult to maintain the battery at its proper voltage. If there are one hundred thirty-two cells in the battery 70 which is a lead acid battery a trickle charge at 2.15 volts per cell would be necessary to sustain each cell of this battery and with one hundred thirty-two cells at 2.15 volts per cell the input voltage should be approximately 283.8 volts. To equalize the whole battery at 2.4 volts per cell would require 316.8 volts and since the battery requires an equalizing charge of 2.4 volts per cell to sustain it at a 2.15 volts per cell, the additional or undesirable voltage would be 33 volts. Thus it is desirable to maintain the power conversion unit to provide a 2.15 volts per cell on the battery and provide an additional charging unit to equalize the cells in the battery bank. The battery bank is then divided in six equal units of twenty-two cells per unit and the twenty-two cells of each unit is equalized or charged at 2.4 volts while the remaining five-sixths of the battery bank or one hundred ten cells are still maintained at a charging voltage of 2.14 volts. Thus the twenty-two cells at 2.4 volts provide 52.8 volts and the one hundred ten cells at 2.15 volts will provide 236.5 volts. Thus if we charge only one-sixth of the battery bank at one time we should always have a total of 289.3 volts and since the normal or desired volts is 283.8 volts the difference is only 5.5 volts undesirable which is 2% of the desired output voltage and can be readily employed in this circuit, whereas if we were to step up the power transfer voltage to 316.8 we would have an undesirable voltage of 33 volts which would be more than 12% greater than the desired voltage. To meet these demands it was discovered that one-sixth of the battery bank can be charged at specific periods at 2.4 volts and maintain the battery at its proper voltage within the permissible voltage limits to thereby maintain a constant torque on the glass drawing motors. Each group of one-sixth of the battery bank may be provided with a charge of 2.14 volts for twenty-four hours each month or at other periods when found necessary to maintain the battery properly equalized.

In order to perform this the battery bank 70 is divided into six equal groups by bringing out the lines 70a, 70b, 70c, 70d and 70e to two groups of contacts as illustrated in Fig. 3. The positive battery circuit B12 being at one end to the last contact 101 of the outer group of contacts 101a, 101b, 101c, 101d, 101e and 101 and the negative battery B13 being connected to the first contact 102 of the second or inner group of contacts 102, 102a, 102b, 102c, 102d and 102e and the contacts intermediate thereof being connected together as illustrated. The movable contact 103 engages the outer contacts of the series 101 and the movable contact 104 engages the inner contacts of the series 102. The movable contacts 103 and 104 are moved in unison so that they will engage the same set of contacts at the same relative position throughout their swing over the contact series 101 and 102 thereby connecting each of the groups of battery cells 70a to 70f independently of the other groups.

The movable contactors 103 and 104 are in turn connected directly to the switch members 99 and 100 which may connect to any one of the negative terminals 1EC12 or 2EC12 or either one of the negative terminals 1EC13 and 2EC13 of either one of the battery equalizing charger circuits as illustrated in Fig. 4 of which there are two as indicated in Fig. 1 by the east and west power converter charger unit, both representing the same circuit as an equalizing charger number 1 or an equalizing charger number 2, the first feed from line east and the second feed from line west as indicated in Fig. 1.

Referring now to Fig. 4 the contacts 1EC and 2EC12 and 1EC and 2EC13 are connected to the bus lines E12 and E13 which are + and − respectively.

The line east represented by the three phase system with the lines 1, 2 and 3 are each provided with the same type of circuit breaker protection and control wherein the main circuit breaker coil EB is connected in series with the release button 7 and the starter button 4 which is in multiple with the EBH contact or hold contact, the circuit being connected between the phases of lines 1 and 2 as shown in Fig. 4. Thus when the starter button 4 is depressed, current is immediately supplied from phase 1 through the stop button 7 to the main breaker coil EB and thence to phase 2. Upon energization the hold contact EBH is closed to maintain this circuit when the pushbutton 4 is released. When the main circuit breaker EB becomes energized it closes the contacts EB1, EB2 and EB3 to connect the three phase system to the lines A, B and C which are connected to the intermediate point of the doubler rectifiers A32 and A33—B32 and B33—C32 and C33. These doubler rectifiers being connected in a closed loop circuit in series with the saturable reactor coils 34 and 35 in each of the phases as indicated on the drawings and as described in conjunction with the same circuit as in Fig. 2. The isolation transformer 23 has its secondary connected to the lines 24 and 28 in the same manner to supply current to the bridge 27 for the purpose of supplying positive direct current from the line 30 through the resistor 43 and the saturable reactor coils 40 in each phase and thence by means of the line 45 to an intermediate point in the potentiometer 46 and return to the negative side of 31 of the bridge rectifier 27. Again in like manner the saturable reactor coils 41 of each phase are connected in series between the line 47 of the potentiometer 46 and the line 31. The opposite side 26 of the A. C. connection of the bridge rectifier 27 is connected directly by the line 60 to the doubler circuit in the form of the rectifier 61 and 62 each of which is in series with its respective coil 63 and 64, the other ends of which are connected to the opposite side of the secondary through the line 24. The coils 63 and 64 being control coils of the voltage control magnetic amplifier 16, the constant input of which is obtained in the same manner through the voltage regulator VR, the bridge rectifier 54 the positive side of which is connected to the resistance 52, a midtap which is connected through the resistance 55, that is in turn connected by the line 56 to one end of the constant voltage supply 57, the other end of which is connected from the line 58 to the adjustable connection to the potentiometer 59 connected across the positive and negative bus terminals E12 and E13 or 31. The resistance 52 is connected across from the positive to the negative side to the bridge rectifier 54 and the negative side of which is connected directly to the line 31 which in Fig. 4 is also the negative bus E13 which is also connected to the negative bus E13 through the ammeter indicated at I.

The three phase alternating current supply AC is connected through the power transformer with its star primary and delta secondary indicated at 36 and 37 to the full wave three phase rectifier 38 to supply the positive bus line E12 and the negative bus line 31.

It will be noted that this charger circuit is provided with only a voltage control magnetic amplifier which maintains a proper voltage on the particular section of the battery as being charged during its allotted period of the week or month to maintain a constant output voltage of 2% under conditions of 10% regulation of the A. C. voltage. The switch contactors 103 and 104 of Fig. 3 may be operated from a time clock so as to repeat their cycle periodically in charging each section of the battery to equalize the voltage thereof. In view of the fact that the circuit of Fig. 3 is merely an equalizing charger, it is not necessary to provide the same with a current control magnetic amplifier regulator. Such a timer motor may also be provided to shift each of the charging circuits from lines representing the power conversion and the equalizing charger from the lines east to the lines west periodically so as to insure by observation the operating conditions of each of the circuits.

Thus with this type of power conversion unit and equalizing charging circuits together with the use of the counter E. M. F. cells in series with the battery, one may be assured of 100% operation of the motors under constant torque for a long period of time or at least an ample time that would provide sufficient warning to take care in an emergency wherein it is known to the glass furnace operator that eventually their battery will fail upon continued operation under which circumstances measures can be taken to avoid greater loss due to outage. However, the batteries will operate for a considerable length of time and instruments can be provided to determine or prognosticate the extent of the operation of the same.

We claim:

1. A battery control circuit comprising an A. C. supply line connected to a rectifier with its D. C. output connected to a multicell battery which in turn is connected to a load, a saturable reactor having a first, a second and a third coil means, said first coil means interposed between said A. C. supply and said rectifier, said second coil means connected across a selected portion of said D. C. output, a bridge rectifier energized from an isolated A. C., the third coil means connected in series with said bridge rectifier and a selected portion of said D. C. output, a magnetic amplifier means having reference and control means, said control means interposed between said isolated A. C. and said bridge rectifier, a voltage regulator connected to said isolated A. C. and supplying a second bridge rectifier, said reference means connected to the D. C. output of said second bridge rectifier and a selected portion of said D. C. output.

2. The circuit of claim 1 characterized in that said first coil means in said saturable reactor is two windings in multiple with a rectifier in series with each winding, one rectifier being reversed relative to the other to form a doubler circuit.

3. The circuit of claim 1 characterized in that an impedance is placed in multiple with the D. C. side of said first bridge rectifier and a second impedance is connected in series with said second coil means.

4. The circuit of claim 1 characterized in that said A. C. supply line having connected thereto and energized thereby an A. C. relay having a normally open back contact, a D. C. relay having connected in series with its operating coil a holding contact and a normally closed pushbutton across said D. C. output, the back contact of said A. C. relay connected in multiple with said holding contact and said pushbutton to energize said D. C. relay when the A. C. power fails and to maintain said D. C. relay energized until said pushbutton is depressed, a manually operable impedance, a second contact means on said D. C. relay having a back contact connecting one A. C. side of said first bridge rectifier to said control means and a front contact to connect said one A. C. side of said first bridge rectifier in series with said isolated A. C. and said manually operable impedance to substitute the latter for the magnetic amplifier.

5. The circuit of claim 1 characterized in that said magnetic amplifier includes a voltage control core with two control windings connected in multiple with a rectifier in series with each winding, said rectifiers disposed to pass currents in opposite directions to form a doubler circuit for said control means, and a reference winding forming said reference means.

6. The circuit of claim 5 characterized in that said magnetic amplifier also includes a current control core with two control windings connected in multiple with a rectifier in series with each winding, said rectifiers disposed to pass currents in opposite directions to form a doubler, the control winding of both the voltage and current control cores being connected in series to form said control means, and two reference windings on said current control core one connected to the D. C. side of said second bridge rectifier and the other connected in series with said D. C. output and said battery, the negative of said D. C. output connected to the negative of said second bridge rectifier.

7. The circuit of claim 1 characterized in that a switch means connects said D. C. output to said multicell battery and then only to a selected number of said battery cells.

8. The circuit of claim 7 which also includes a timer to change said switch means periodically to charge each battery cell in continuous sequence.

9. The circuit of claim 1 characterized by a voltage regulator tube and a resistance connected in series across said multicell battery, a bank of counter E. M. F. cells connected in series with one side of said multicell battery and said load each counter E. M. F. cell having an independent contact, a potentiometer connected across said load, a motor to connect one end with the contact of each of said counter E. M. F. cells in progression to short circuit the same, a pair of relays each having their operating coils connected intermediate said voltage regulator tube and said series resistance and the other side to said potentiometer, a rectifier connected in series with each relay opening coil, said rectifiers being connected to pass current in opposite directions, and contacts on one of said relays to operate said motor and progressively short out said counter E. M. F. cells and contacts on said other relay to operate said motor to progressively remove the short circuit on said counter E. M. F. cells.

10. The circuit of claim 1 characterized in that said circuit is duplicated as a second circuit, and switch means to alternately connect the D. C. output of the first or the second circuits to said battery.

11. The circuit of claim 1 characterized in that said circuit is quadruplicated as a first, second, third and fourth circuits, switch means to alternately connect the D. C. output of the first or the second circuits to the whole of said battery, and a second switch means to alternately connect the D. C. output of the third or the fourth circuits to progressive sections of said battery.

References Cited in the file of this patent

UNITED STATES PATENTS

| | | |
|---|---|---|
| 2,179,299 | Mureck | Nov. 7, 1939 |
| 2,306,998 | Claesson | Dec. 29, 1942 |
| 2,810,877 | Silver | Oct. 22, 1957 |